United States Patent
Ignatin (10) Patent No.: US 7,949,463 B2
(45) Date of Patent: May 24, 2011

(54) INFORMATION FILTERING AND PROCESSING IN A ROADWAY TRAVEL DATA EXCHANGE NETWORK

(75) Inventor: Gary Ignatin, Newport Coast, CA (US)

(73) Assignee: Gary Ignatin

( * ) Notice: Subject to any disclaimer, the term of this patent is extended or adjusted under 35 U.S.C. 154(b) by 1026 days.

(21) Appl. No.: 11/005,091

(22) Filed: Dec. 6, 2004

(65) Prior Publication Data

US 2005/0131626 A1   Jun. 16, 2005

Related U.S. Application Data (60) Provisional application No. 60/530,088, filed on Dec. 15, 2003.

(51) Int. Cl.
*G08G 1/00* (2006.01)
*G01C 21/00* (2006.01)

(52) U.S. Cl. ........ 701/117; 701/118; 701/119; 701/200; 701/201; 340/988; 340/995.13; 342/454; 342/456

(58) Field of Classification Search .......... 701/117–119, 701/200, 201; 340/988, 995.13; 342/454, 342/456

See application file for complete search history.

(56) References Cited

U.S. PATENT DOCUMENTS

| | | | |
|---|---|---|---|
| 6,236,933 B1 * | 5/2001 | Lang ............................. | 701/117 |
| 6,466,797 B1 * | 10/2002 | Frodigh et al. ............. | 455/456.1 |
| 6,466,862 B1 * | 10/2002 | DeKock et al. ............... | 701/117 |
| 6,490,519 B1 * | 12/2002 | Lapidot et al. ................ | 701/117 |
| 6,650,948 B1 * | 11/2003 | Atkinson et al. ............... | 700/66 |
| 6,711,493 B1 * | 3/2004 | Andrews et al. .............. | 701/117 |
| 6,804,524 B1 * | 10/2004 | Vandermeijden .......... | 455/456.1 |
| 6,810,321 B1 * | 10/2004 | Cook ............................ | 701/117 |
| 6,925,378 B2 * | 8/2005 | Tzamaloukas ................ | 701/200 |
| 6,988,032 B2 * | 1/2006 | Chiang ......................... | 701/117 |
| 7,113,865 B2 * | 9/2006 | Ignatin ......................... | 701/200 |
| 7,499,949 B2 * | 3/2009 | Barton ....................... | 707/104.1 |
| 2002/0026278 A1 * | 2/2002 | Feldman et al. .............. | 701/117 |
| 2002/0091486 A1 * | 7/2002 | Hubschneider et al. ...... | 701/209 |
| 2002/0107634 A1 * | 8/2002 | Luciani ........................ | 701/117 |
| 2003/0014180 A1 * | 1/2003 | Myr .............................. | 701/117 |
| 2004/0073361 A1 * | 4/2004 | Tzamaloukas et al. ....... | 701/210 |
| 2004/0249571 A1 * | 12/2004 | Blesener et al. ............. | 701/301 |
| 2005/0288856 A1 * | 12/2005 | Uyeki et al. ................. | 701/210 |

FOREIGN PATENT DOCUMENTS

| | | | |
|---|---|---|---|
| JP | 2000222693 | * | 8/2000 |
| WO | WO-0203350 | * | 1/2002 |

* cited by examiner

*Primary Examiner* — Jack Keith
*Assistant Examiner* — Chuong P Nguyen
(74) *Attorney, Agent, or Firm* — McAndrews, Held & Malloy, Ltd.

(57) ABSTRACT

Systems and methods for information filtering in a roadway travel data exchange network are disclosed. In one embodiment, a travel data processing system may comprise, for example, a communication network. A mobile device may be communicatively coupled to the communication network. A collection system may collect first travel data, where the first travel data may comprise second travel data that is relevant to the mobile device. A filter system may analyze the first travel data to control the flow of at least a portion of the second travel data. A filter device may be communicatively coupled to the communication network and the filter device may comprise at least a portion of the filter system. The mobile device may comprise at least a portion of the filter system.

11 Claims, 12 Drawing Sheets

INFORMATION FILTERING AND PROCESSING IN A ROADWAY TRAVEL DATA EXCHANGE NETWORK

RELATED APPLICATIONS

This application makes reference to, claims priority to, and claims the benefit of U.S. Provisional Patent Application Ser. No. 60/530,088, entitled "Information Filtering And Processing In A Vehicular Travel Data Exchange Network", filed Dec. 15, 2003, the complete subject matter of which is hereby incorporated herein by reference, in its entirety.

INCORPORATION BY REFERENCE

In addition, the applicant hereby incorporates the complete subject matter herein by reference, in its entirety, of U.S. patent application Ser. No. 10/736,819, entitled "Roadway Travel Data Exchange Network", filed Dec. 15, 2003.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The amount of travel data that is available for collection and processing at any given moment is substantial. There may be hundreds of thousands of vehicles that may contribute travel related data, such as speed and location, for further processing. However, the efficiency and speed of the information processing may be significantly reduced if travel data from each and every vehicle is continuously considered and further processed. In addition, travel data may be contributed from vehicles, which are actually not actively involved in the traffic flow (for example, parked vehicles and vehicles driving very slowly).

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Aspects of the present invention may be found in, for example, systems and methods for information filtering in a roadway travel data exchange network. In one embodiment, a travel data processing system may comprise, for example, a communication network. A mobile device may be communicatively coupled to the communication network. A collection system may collect first travel data, where the first travel data may comprise second travel data that is relevant to the mobile device. A filter system may analyze the first travel data to control the flow of at least a portion of the second travel data. A filter device may be communicatively coupled to the communication network and the filter device may comprise at least a portion of the filter system. The mobile device may comprise at least a portion of the filter system. The filter device may comprise a first portion of the filter system and the mobile device may comprise a second portion of the filter system. The filter system may use known roadway information and/or pedestrian velocity estimates.

In another aspect of the invention, a travel data processing system may comprise a communication network, a mobile traffic participant communicatively coupled to the communication network, the mobile traffic participant associated with travel data, and a filter communicatively coupled to the communication network. The filter may operate on the travel data. The travel data processing system may be associated with a vehicle, where at least one mobile traffic participant may comprise a device installed in the vehicle. The mobile traffic participant may provide the travel data. The filter may use known roadway information and/or pedestrian velocity estimates to perform filtering. The mobile traffic participant may collect and/or transmit at least a portion of the travel data. The mobile traffic participant may receive commands generated in response to the filter. The mobile traffic participant may receive and/or display at least a portion of the travel data. The mobile traffic participant may comprise at least a portion of the filter. The travel data may comprise location information and/or velocity information.

In yet another aspect of the invention, a method for processing travel data for use with a plurality of mobile travel participants may comprise receiving, from the plurality of mobile travel participants, travel data via a communication network. The travel data may be filtered to obtain filtered travel data. The filtered travel data may represent relevant traffic information. The filtered travel data may be transmitted to at least a portion of the plurality of mobile travel participants. The filtering may comprise selectively eliminating at least one portion of the travel data received, if the at least one portion is determined to be irrelevant based on at least one predetermined criteria.

These and other features and advantages of the present invention may be appreciated from a review of the following detailed description of the present invention, along with the accompanying figures in which like reference numerals refer to like parts throughout.

DETAILED DESCRIPTION OF THE INVENTION

Certain embodiments of the present invention relate to filtering of information that is exchanged in a roadway travel data exchange network. In particular, certain embodiments of the present invention enable collection, processing, filtration and delivery of travel data. The travel data may be collected and filtered automatically by a plurality of vehicles that are traveling at a given time. Travel data may also be filtered according to a user-defined criteria upon its communication to a specific vehicle on the roadway travel data exchange network.

Figure 1:
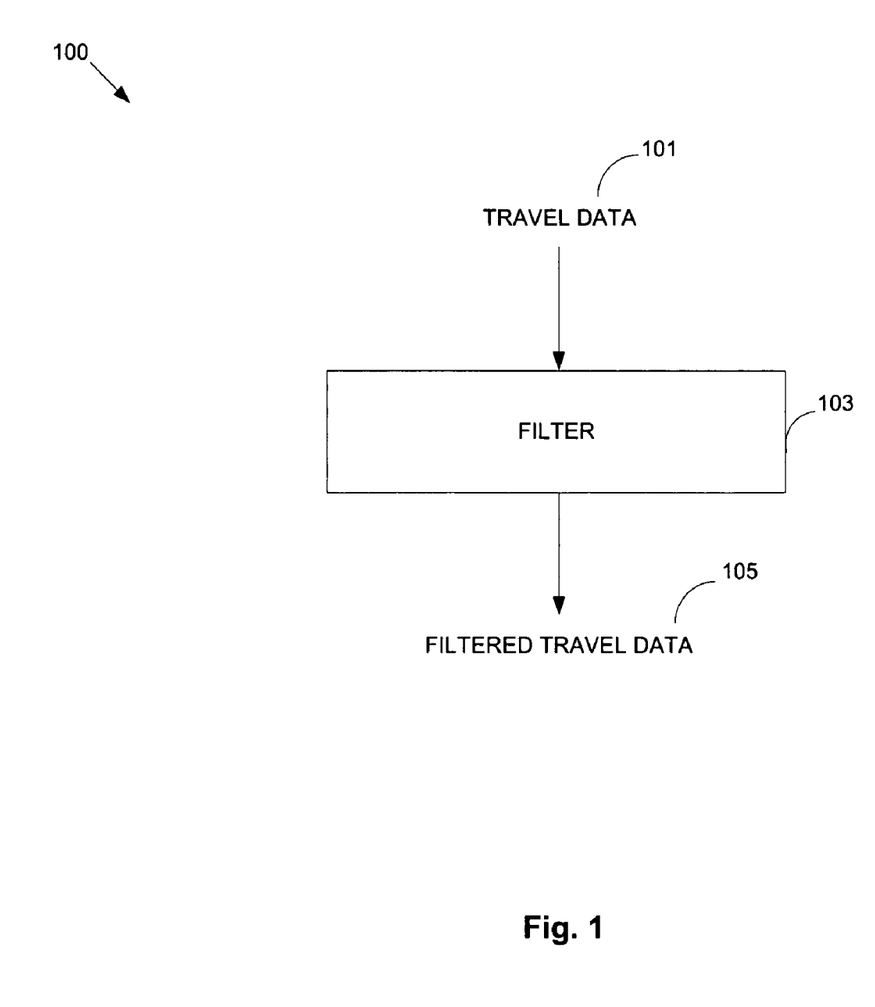
FIG. 1 is a diagram illustrating a general embodiment of information filtering in a roadway travel data exchange network, in accordance with various aspects of the present invention.

FIG. 1 is a diagram illustrating a general embodiment of information filtering 100 in a roadway travel data exchange network, in accordance with various aspects of the present invention. Travel data 101 may be collected in a roadway travel data exchange network. Due to the substantial volume of traffic-related data that may be collected at a given moment in time, in order to increase efficiency and accuracy in the exchange of information, a filter 103 may be used in order to filter the travel data according to different criteria and methods, and obtain filtered travel data.

Filtering the travel data may comprise completely removing specific portions of the travel data, or it may involve assigning different weights to travel data received from different vehicles on the roadway travel data exchange network. Rather than completely discarding travel data, a storage and processing system may assign a lower or a higher weight for purposes of making further determinations during the processing of the travel data. In one embodiment, such weighting may be used to adjust for known imprecision in the equipment measuring the travel data. For example, a GPS device may have an accuracy of plus or minus ten feet, and may determine that a first vehicle's location is within five feet of a sidewalk and a second vehicle is in the center of a roadway more than twenty feet from either sidewalk. The storage and processing system may then assign a lower weight to the data reported by the first vehicle, as it is possible that the vehicle is parked near the sidewalk or otherwise not actively participating in the traffic flow. The storage and processing system may assign a higher weight to the data reported by the second vehicle, because it is within the boundries of the roadway even taking into account the imprecision of the measuring equipment.

The filter 103 may be software, hardware, firmware, or any combination thereof. For example, in one embodiment of the present invention, the filter 103 may be a software module designed to function according to a specific filtering algorithm.

Figure 2A:
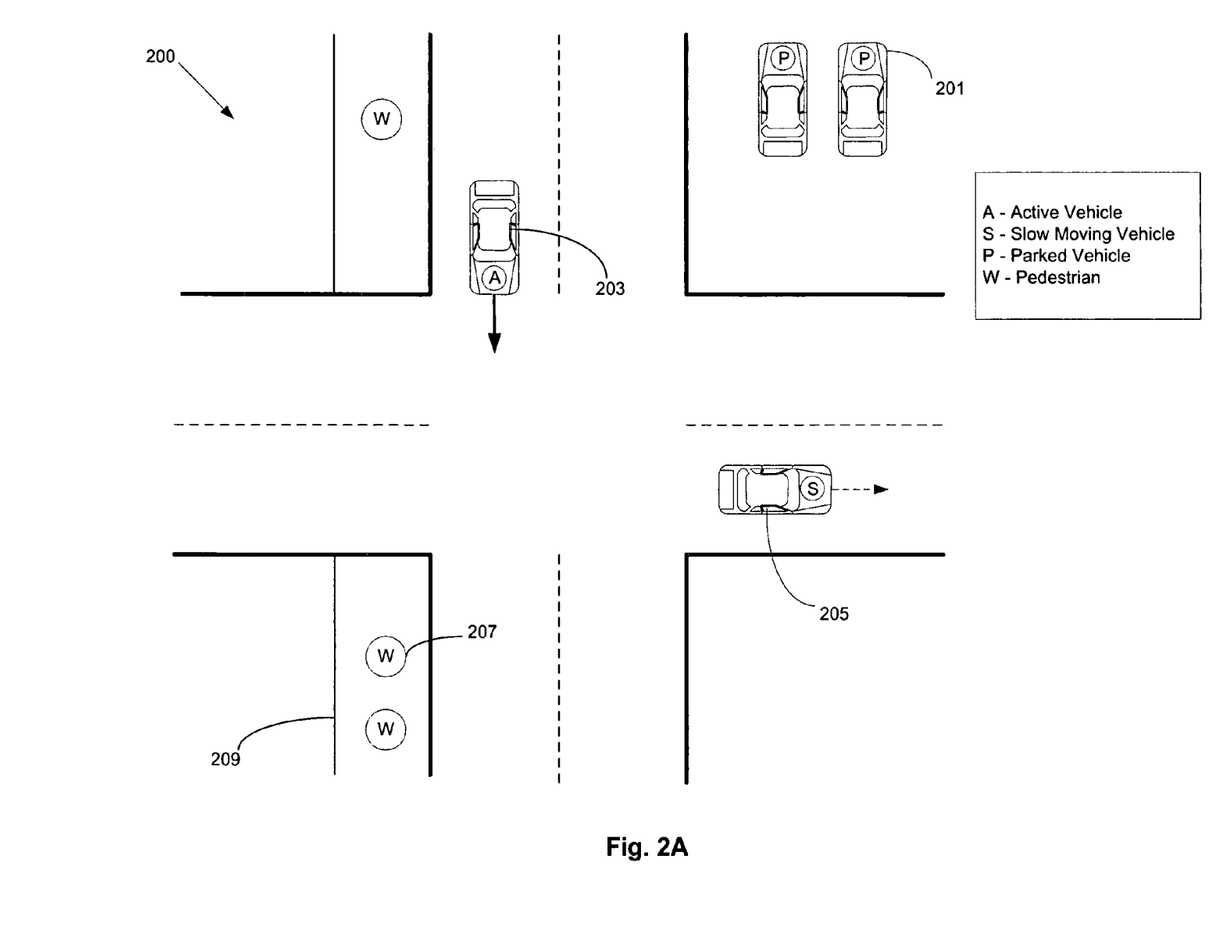
FIG. 2A is a diagram of a road intersection illustrating types of information filtering depending on the traffic participant in a roadway travel data exchange network, in accordance with various aspects of the present invention.

FIG. 2A is a diagram of road intersection illustrating types of information filtering depending on the traffic participant in a roadway travel data exchange network, in accordance with various aspects of the present invention. The overhead view of the road intersection 200 illustrates several types of information filtering depending on the type of traffic participant. As discussed more completely below, travel data may be reported from a plurality of traffic participants at any given moment. But not all reported information may be useful. For example, vehicles 201 are parked and not actively involved in the traffic flow at intersection 200. Travel data from vehicles 201, therefore, may be filtered and not reported in a roadway travel data exchange network. Vehicle 203, on the other hand, is actively involved and traveling at the allowed speed limit on intersection 200. Travel data collected from vehicle 203 may be fully utilized and not filtered. Another vehicle 205 may also be traveling on the intersection 200 close to a sidewalk. Travel data relating to the location of vehicle 205 may be given lower weight. Travel data related to the vehicles 201 may be assigned even lower weight as these vehicles are parked off of the roadway entirely. However, in the event that the airbag of vehicle 205 deployed, travel data relating to such airbag status may be automatically transmitted and utilized in the roadway travel data exchange network as it may indicate a potential accident on that road. A different example of travel data that may be filtered out is traffic-related information received from a pedestrian 207, who is walking on a sidewalk 209.

In order to increase the efficiency in processing the travel data, the storage and processing system on the roadway travel data exchange network may utilize methods to determine whether it has sufficient travel data from a particular location. If so, the storage and processing system can disregard the travel data received for the particular location. If the storage and processing system has insufficient information on the location, then the received travel data may be further processed. In order to achieve this initial filtering test, the storage and processing system may, for example, be configured so that it considers travel data from a first location for a particular given time. If the storage and processing system already has travel data from the first location or a second location that is within a predetermined distance from the first location, and this travel data is relatively recent, then the storage and processing system may use the travel data it already has on the second location and reject any data from the first location. Travel data does not necessarily have to be real-time travel data and from the exact location in order to be relevant. A storage and processing system administrator may determine whether information is relevant or not, i.e. determine the criteria for keeping the travel data. The relevant travel data may be saved at a traffic database at the storage and processing system. After travel data is determined to be no longer relevant, the travel data may be discarded or moved from the traffic database to a historical database at the storage and processing system.

Figure 2B:
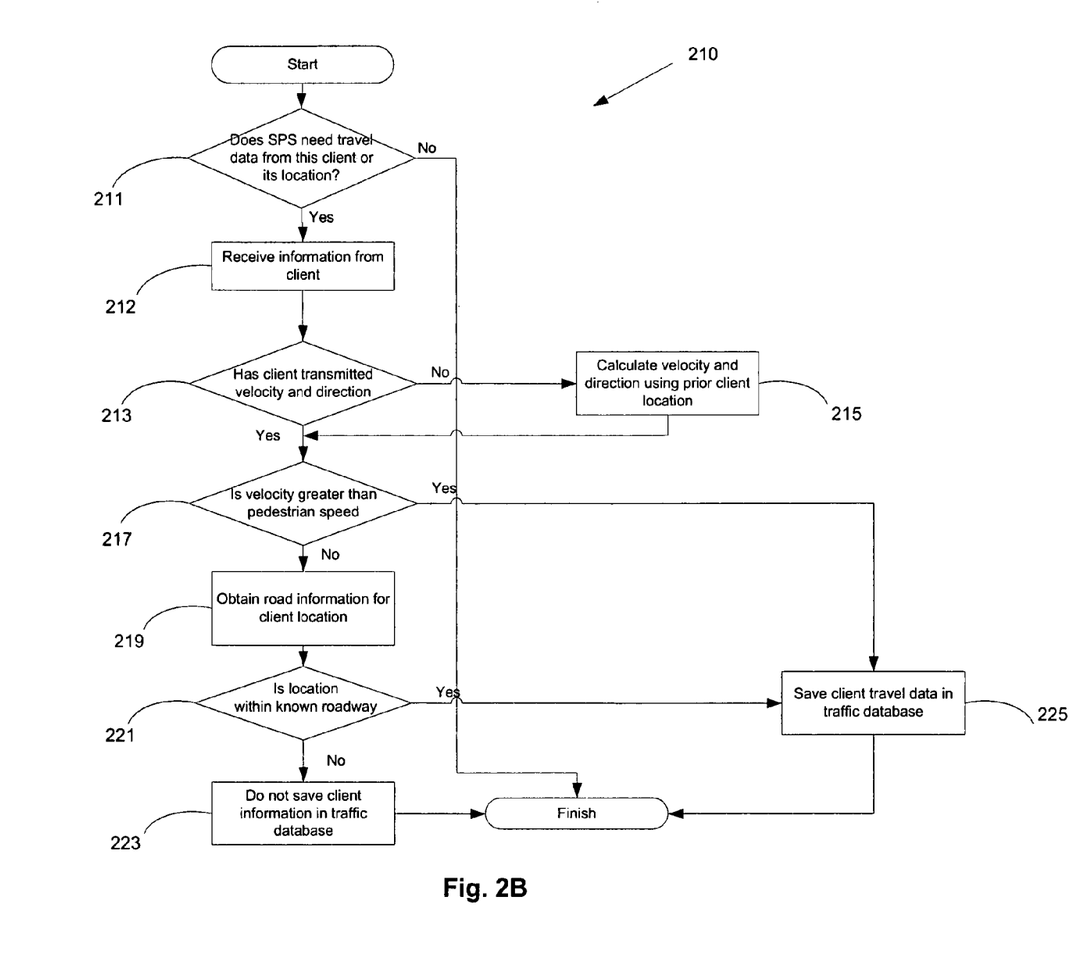
FIG. 2B is a flowchart illustrating a general embodiment of a method for filtering of travel data on a roadway travel data exchange network, in accordance with various aspects of the present invention.

Referring now to FIG. 2B, there is illustrated a flowchart of a general embodiment of a method for filtering 210 of travel data on a roadway travel data exchange network, in accordance with various aspects of the present invention. The method 210 may be utilized, for example, to filter out travel data based on two filtering criteria—velocity and location. At 211, the storage and processing system makes the initial determination, as discussed above, of whether it needs travel data from the reporting client and its location. If the storage and processing system has sufficient travel data for such client or location, then no further information is collected. At 212, the storage and processing system receives travel data, such as location and speed, from a client. In 213 it is determined whether the client system has transmitted velocity and direction. If not, then in 215 velocity and direction is calculated using a prior client system location and the current client system location. The storage and processing system compares, in 217, the vehicle's velocity to a hypothetical maximum pedestrian speed. If the velocity is greater than the pedestrian speed, then there is high probability that the client is in an active vehicle and its travel data is stored in the traffic database, at 225. Assuming the client is moving at a speed less than the pedestrian speed, the storage and processing system obtains road information for the current client location, in 219. In 221 it is determined whether the client is located on a known roadway. If it is not, then in 223 the client travel data is discarded. If client is located within a known road, then the travel data is saved in the traffic database, in 225.

The initial filtering step 211, as well as the filtering steps 217 and 221, may be performed by both or either of the storage and processing system and the client system. For example, the initial filtering of 211 may be performed by the storage and processing system, and the subsequent filtering at 217 and 221 may be performed by the client system, i.e. the client may measure location and velocity and may not transmit any data to the storage and processing system if the speed is less than the pedestrian speed and the location is not within a known roadway. The client system may, independently or with assistance of the storage and processing system, determine whether it is on a road and/or is moving at a speed greater than a maximum pedestrian speed, and only report travel data to the storage and processing system if indeed it is traveling on a road. In this way, the amount of communication overhead needed to report relevant travel data is substantially reduced. The determination of whether filtering is performed by the storage and processing system and/or by the client system depends on considerations such as power management, available storage resources and bandwidth, and costs.

In a different embodiment of the present invention, travel data filtering method may comprise only several of the filtering criteria utilized in method 210. For example, a client system may only determine its geographic location and transmits that information to a storage and processing system. Filtering of the client's travel data may then be accomplished by utilizing only steps 219 and 221, by comparing the geographic location information received from the client system with a database with location information for roadways. If the client system is located in an area identified by the database as a roadway, then the storage and processing system may keep the information. If the identified area is not recognized as a roadway, then the received travel data may be discarded. Since the client is not on a known road, its reported travel data will be filtered out.

The methods for filtering travel data by location may also take into account the accuracy of both the location information and the roadway information. For example, if the location information is obtained by a given vehicle with an accuracy of +/−10 feet, and the roadway database provides location information for roadways with accuracy of +/−20 feet, then the storage and processing system may discard travel data from vehicles located 30, or more, feet from a known roadway. It may assign lesser weight to vehicles located within 30 feet of the sides of a roadway, and greater weight to vehicles located inside a roadway greater than 30 feet away from either side of the roadway.

Figure 2C:
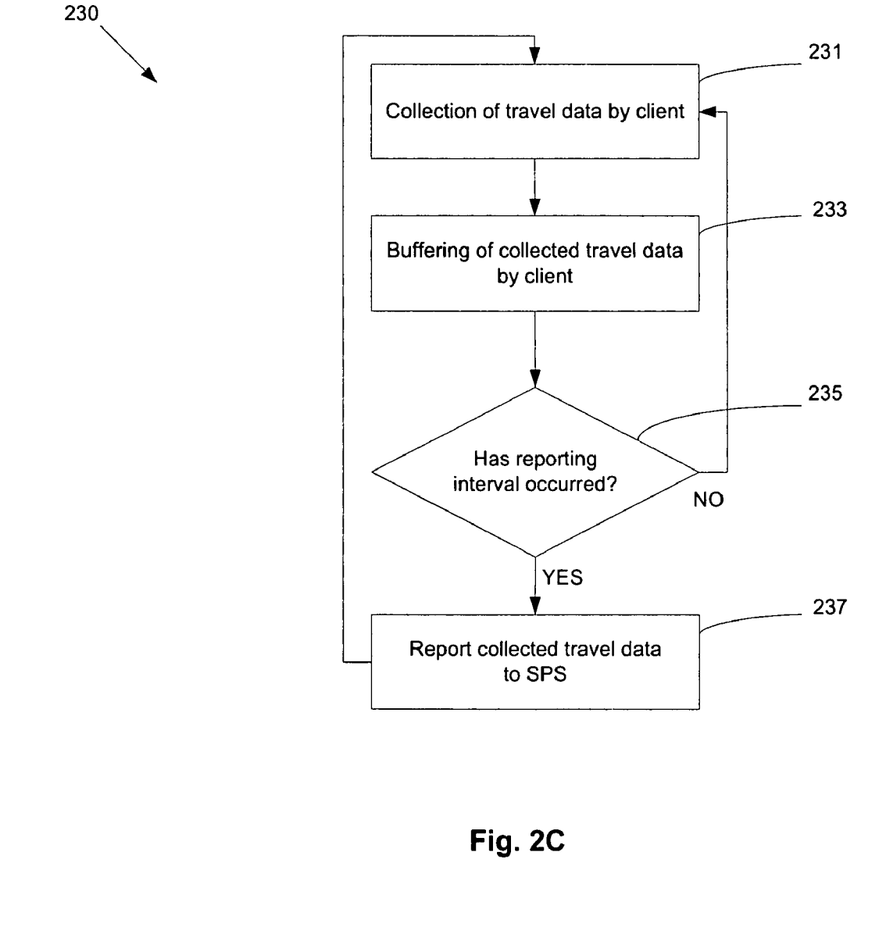
FIG. 2C is a flowchart illustrating a data collection loop for travel data collection and delayed reporting in a roadway travel data exchange network, in accordance with various aspects of the present invention.

FIG. 2C is a flowchart illustrating a data collection loop 230 for travel data collection and delayed reporting in a roadway travel data exchange network, in accordance with various aspects of the present invention. The storage and processing system may be continuously updated with travel data. However, in order to reduce the transmission and processing overhead on the storage and processing system and all involved client systems, it may be more efficient if each client does not continuously update the storage and processing system. A client system may collect travel data, buffer it and transmit the buffered travel data to the storage and processing system only at a predetermined reporting interval. A data collection loop 230 may be implemented on the client system. Travel data is collected by the client system at 231 and is then buffered by the client system at 233. At query 235, it is determined whether the reporting interval has occurred. If it has occurred, then the buffered travel data is communicated to the storage and processing system. If it has not occurred, then collection of travel data resumes at 231.

In an embodiment of the present invention, the client system may report only changes in the travel data within a predetermined range. For example, a client system may report its speed at a given moment. However, if the speed is being maintained constant for a certain period of time, the client system may not initiate any reporting to the storage and processing system. However, if the speed changes within a predetermined range (e.g., speed increases with 5 mph), then the client system will report that change to the storage and processing system. Similar filtering criteria may be applied with regard to other types of travel data.

Figure 2D:
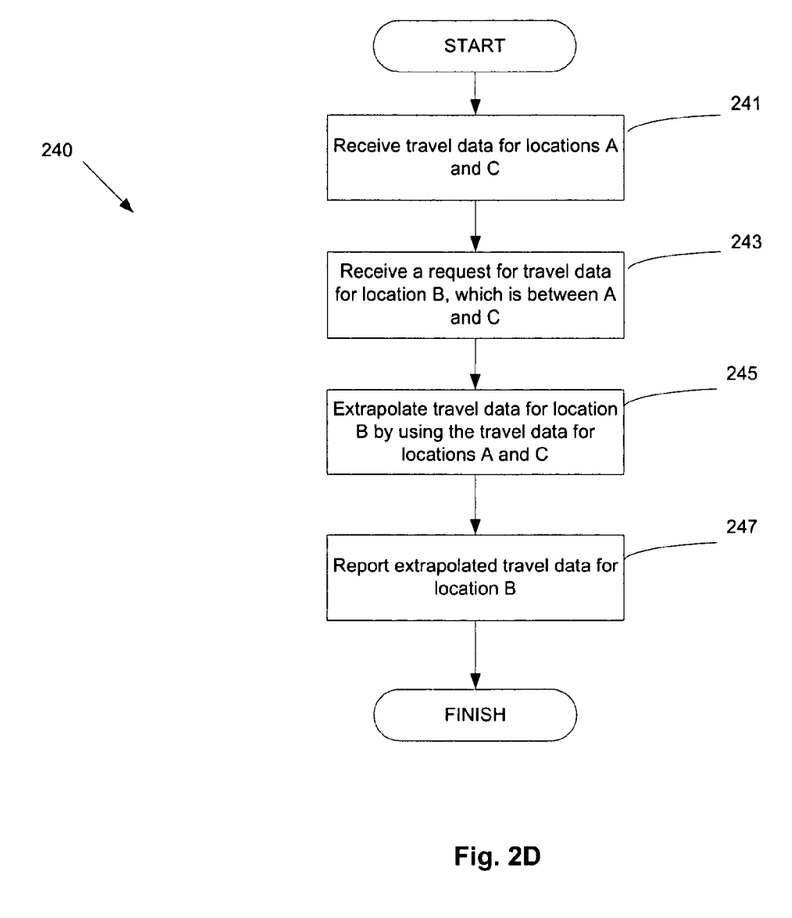
FIG. 2D is a flowchart illustrating a general embodiment of a method for extrapolating travel data on a roadway travel data exchange network, in accordance with various aspects of the present invention.

FIG. 2D is a flowchart illustrating a general embodiment of a method 240 for extrapolating travel data on a roadway travel data exchange network, in accordance with various aspects of the present invention. Method 240 may be used when the storage and processing system does not have enough travel data for a certain location of interest, location B, but the storage and processing system has sufficiently reliable travel data for surrounding locations A and C. At 241, the storage and processing system may receive travel data associated with locations A and C. At 243, the storage and processing system receives a request for travel data for location B, situated between A and C. At 245, travel data for locations A and C is extrapolated in order to receive extrapolated travel data for location B. At 247, the extrapolated travel data for location B is reported.

Figure 3:
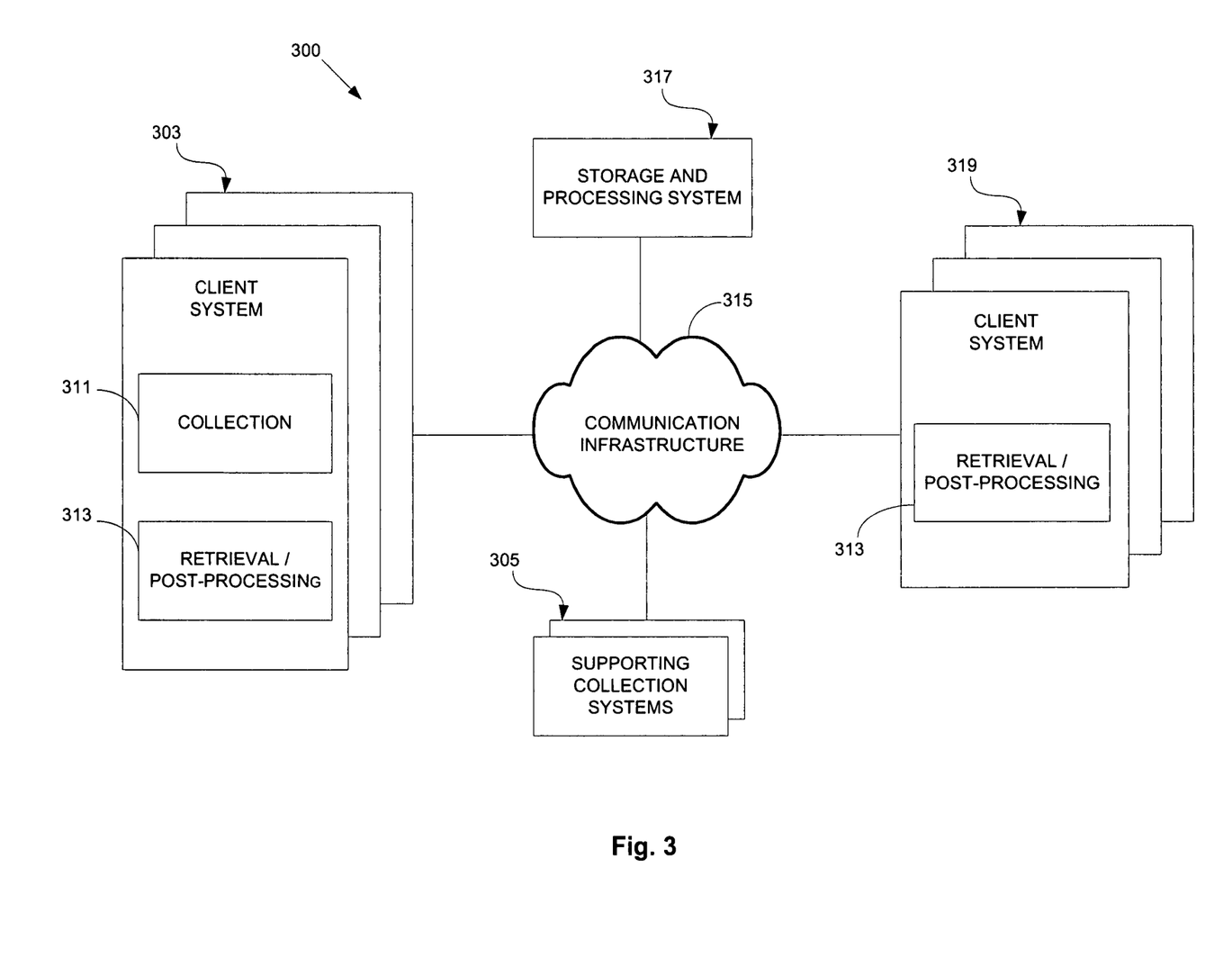
FIG. 3 is a diagram illustrating an embodiment of a roadway travel data exchange network supporting collection, processing and delivery of travel data, in accordance with various aspects of the present invention.

FIG. 3 is a diagram illustrating a roadway travel data exchange network 300 supporting collection, processing and exchange of travel data, in accordance with various aspects of the present invention. The roadway travel data exchange network 300 comprises a communication infrastructure 315, pluralities of client systems 303 and 319, supporting collection systems 305, and a storage and processing system 317. The plurality of client systems 303 comprise collection systems 311 and retrieval/post-processing systems 313. However, the plurality of client systems 319 comprise retrieval/post-processing systems 313 and no collection systems 311.

The plurality of client systems 303 collect travel data and deliver the collected data to the storage and processing system 317 via the communication infrastructure 315. The storage and processing system 317 also receives collected travel data from the supporting collection systems 305. These collection processes occur both periodically and in real time.

To support the pluralities of client systems 303 and 319, the storage and processing system 317 correlates, combines and otherwise processes the collected travel data to generate processed data and instructions. The processed data and instructions are delivered to the pluralities of client systems 303 and 319 via the communication infrastructure 315 for post-processing. Post-processing by the pluralities of client systems 303 and 319 may include, for example, communicating the processed data to the user, further computation, control and storage.

Some of the pluralities of client systems 303 and 319 are installed in roadway vehicles. Others of the pluralities of client systems 303 and 319 are portable devices that may be carried inside roadway vehicles. Yet other of the pluralities of client systems 303 and 319 are neither installed nor carried inside roadway vehicles. The plurality of client systems 303, installed or associated with roadway vehicles: (1) collect travel data via the collection systems 311; (2) exchange collected travel data with the storage and processing system 317, the client systems 319, others of the client systems 303, and the supporting collection systems 305, and (3) post-process travel data retrieved from the storage and processing system 317, the client systems 319, others of the client systems 303, and the supporting collection systems 305. Although the plurality of client systems 319 do not perform collection, they also post-process such retrieved and received travel data via the communication infrastructure from the systems 317, 303, 305, and other client systems 319.

The pluralities of client systems 303 and 319 may be categorized as multi-purpose or dedicated client systems. The characteristic feature of a multi-purpose client system is that it may perform various functions related to the travel data as well as additional functions that are not related to travel data. A dedicated client system can only perform functions related to the travel data.

Collection of travel data by the plurality of client systems 303 is accomplished in several ways. Some of the plurality of client systems 303 receive instructions from the systems 317, 319 and 305 and from others of the client systems 303 to deliver, or collect and deliver, certain travel data. Any of the plurality of client systems 303 may be pre-configured or instructed to regularly collect and deliver such travel data without awaiting specific requests. Such "pre-arranged" collection and delivery can occur continuously or as travel data becomes available. The collection and delivery process performed by each of the plurality of client systems 303 may be activated or deactivated via the communication infrastructure or through direct interaction with the client systems 303. The retrieval and post-processing of the plurality of client systems 303 may be similarly activated or deactivated.

Another way for collecting information is for the plurality of client systems 303 to automatically initiate collection (and subsequent delivery) of travel data. For example, upon sensing motion, periodic collection and delivery might be automatically initiated by the client systems 303. Such client system 303 might also periodically collect and deliver the moving vehicle's geographic location, its speed, direction and other travel data. Alternatively, the plurality of client systems 303 may be triggered manually to initiate collection and/or delivery of travel data.

After processing travel data delivered by one of the plurality of client systems 303, the storage and processing system 317 may return processed travel data and/or instructions to the delivering one of the plurality of client systems 303. In addition, the storage and processing system 317 delivers the processed travel data and related instructions to others of the pluralities of client systems 303 and 319. For example, processed travel data may be delivered to one of the client systems 303 in response to travel data collected from another of the client systems. Any of the pluralities of client systems 303 and 319 that receive the processed travel data or related instructions may forward same or post-process and forward post-processed data or instructions to yet others of the pluralities of client systems 303 and 319.

The roadway travel data exchange network 300 is enhanced with capability of receiving additional information that may relate to travel. Such additional travel-related information may be collected by supporting collection systems 305. For example, various governmental agencies or news organizations will have the capability to contribute travel-related data. Governmental agencies that may contribute travel-related data to the roadway travel data exchange network include, for example, a local city police department, a state police department, a sheriff's department, a highway patrol, and a meteorological agency. The travel-related data may be collected by using a client system 303, in a similar manner as discussed above. The travel-related data may comprise, for example, information about the number of vehicles that pass through a certain part of a road, vehicle speed, and direction of travel. If the travel-related data is collected by the governmental agency representative using a device similar to a client system 303, the device may automatically collect and transmit the travel-related data to the storage and processing system 317 for further processing. The governmental agency representative may also collect travel-related data by observation and then enter it into the roadway travel data exchange network by transmitting it directly to the storage and processing system 317. For example, a police officer may be monitoring a busy road intersection and may observe a traffic accident. As a result of the accident, all lanes of the road may become blocked and traffic flow may quickly deteriorate. The police officer may then transmit to the storage and processing system 317 his exact location and the fact that the specific road has been blocked in both directions due to a traffic accident.

The supporting collection systems 305 may comprise, for example, weather-related data collection systems. The weather-related data may be automatically collected by weather sensors placed at key intersections, highways, or roads. The weather-related data may include, for example, outside temperature, precipitation amount and emergency weather data (such as information for an approaching tornado). Certain weather-related data may be entered into the roadway travel data exchange network and transmitted to the storage and processing system 317 via a client system 303. The supporting collection systems 305 may also comprise a meteorological data collection system that delivers travel data in the form of weather information to the storage and processing system 317.

The supporting collection systems 305 also deliver travel data directly to the client systems 303 and 319 for post-processing via the communication infrastructure 315. Instructions may also be delivered by the supporting collection systems 105 to the storage and processing system 317 or the client systems 303 and 319 via the communication infrastructure 315.

The pluralities of client systems 303 and 319 have display capabilities so that collected and processed travel data may be displayed for a user as part of the post-processing functionality of the retrieval/post-processing systems 313. For example, some of the plurality of client systems 303 transmit geographic location (corresponding to either the location of the client system or any other selected location) to the storage and processing system 317, requesting related weather and speed information. In response to such request, the storage and processing system 317 uses the geographic location to access stored travel data to produce the related weather and speed information for delivery to the requesting client system.

The communication infrastructure 315 may comprise a single communication network or a plurality of communication networks. Such networks may comprise wired and wireless portions. More specifically, collection of information and transmission of the collected information via the communication infrastructure 315 may be accomplished by using wireless transmission methods, such as General Packet Radio Service (GPRS) or Wideband Code Division Multiple Access (WCDMA). Collection and transmission on the communication infrastructure 315 may also be accomplished using radio, 802.11 network, ultrawideband communication, or any other means that allow sufficient freedom of movement. Delivery of information on the communication infrastructure 315 can be accomplished by using the same wireless transmission methods that are used for transmission of the collected information. In addition, delivery via the communication infrastructure 315 may be accomplished by using a cable infrastructure, a satellite network infrastructure, a digital subscriber line (DSL) infrastructure, an Internet infrastructure, an intranet infrastructure, a wired infrastructure, a closed communication infrastructure, and a local area network. Complimentary technology exists on the roadway travel data exchange network 300, including the storage and processing system 317, and the client systems 303 and 319 in order to use the communication infrastructure and process travel data on the roadway travel data exchange network.

In an embodiment of the present invention, the roadway travel data exchange network may comprise a plurality of storage and processing systems. For example, in order to increase efficiency in the exchange of information, a storage and processing system may be placed near several major roads or intersections so that travel data may be reported to the storage and processing system which is closest to the reporting vehicle. The plurality of storage and processing systems may be connected together, or to a main storage and processing system, via the communication infrastructure 315. The plurality of processing systems may each be deployed to provide different services or portions of an overall service offering. In such cases, the client systems may employ post-processing that correlates or otherwise combines the services or service information delivered by the plurality of processing systems.

In another embodiment of the present invention, a plurality of client systems 303 may be utilized, as well as a plurality of client systems 319. Travel data that is collected by one or more of the collection systems 311 on the client systems 303 may be transmitted to, and processed by, a storage and processing system. Subsequent results may be utilized by the same client systems 303 which collected the travel data, or by other client systems 303. The same results, however, may also be utilized by one or more of the retrieval/post-processing systems 313 on the plurality of client systems 319.

Figure 4:
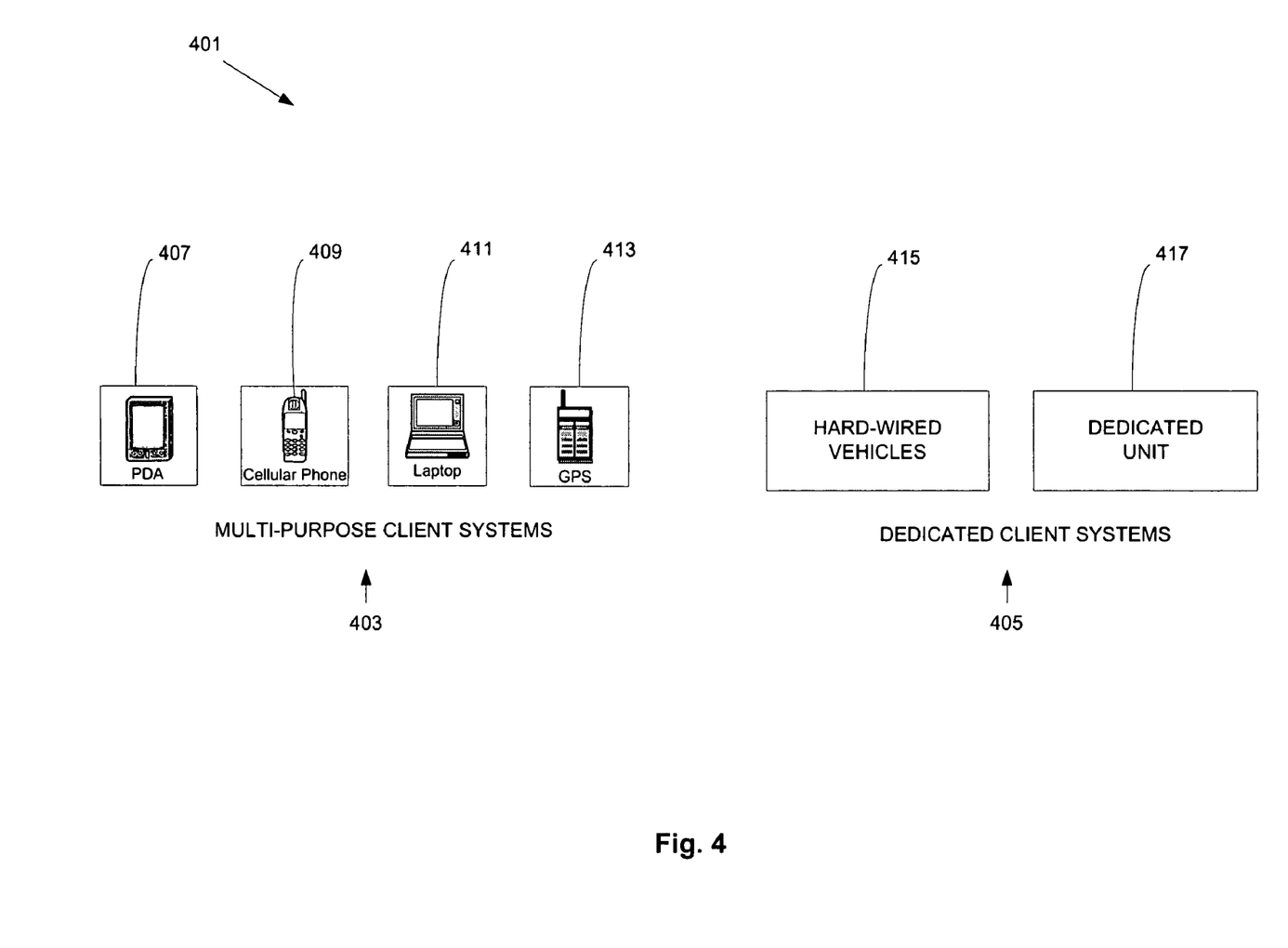
FIG. 4 is a diagram illustrating a plurality of client systems on the roadway travel data exchange network of FIG. 3, for example, in accordance with various aspects of the present invention.

FIG. 4 is a diagram illustrating a plurality of client systems on the roadway travel data exchange network of FIG. 3, for example, in accordance with various aspects of the present invention. The plurality of client systems 401 may comprise one or more of the multipurpose client systems 403 and/or one or more of the dedicated client systems 405. More specifically, the multipurpose client system 403 may be, for example, one or more of a personal digital assistant (PDA) 407, a cellular phone 409, a laptop computer 411, and a global positioning system (GPS) device 413. The multipurpose client system 403 is enabled to collect, transmit, receive and deliver travel data. However, the multipurpose client system 403 may perform additional functions as well. For example, the PDA 407 may store and recall personal information. The dedicated client system 405 may only perform functions related to the travel data. The dedicated client system 405 may comprise a client system 415 physically embedded ("hardwired") in the vehicle. A dedicated client system 405 may also be designed as a portable dedicated unit 417.

Figure 5:
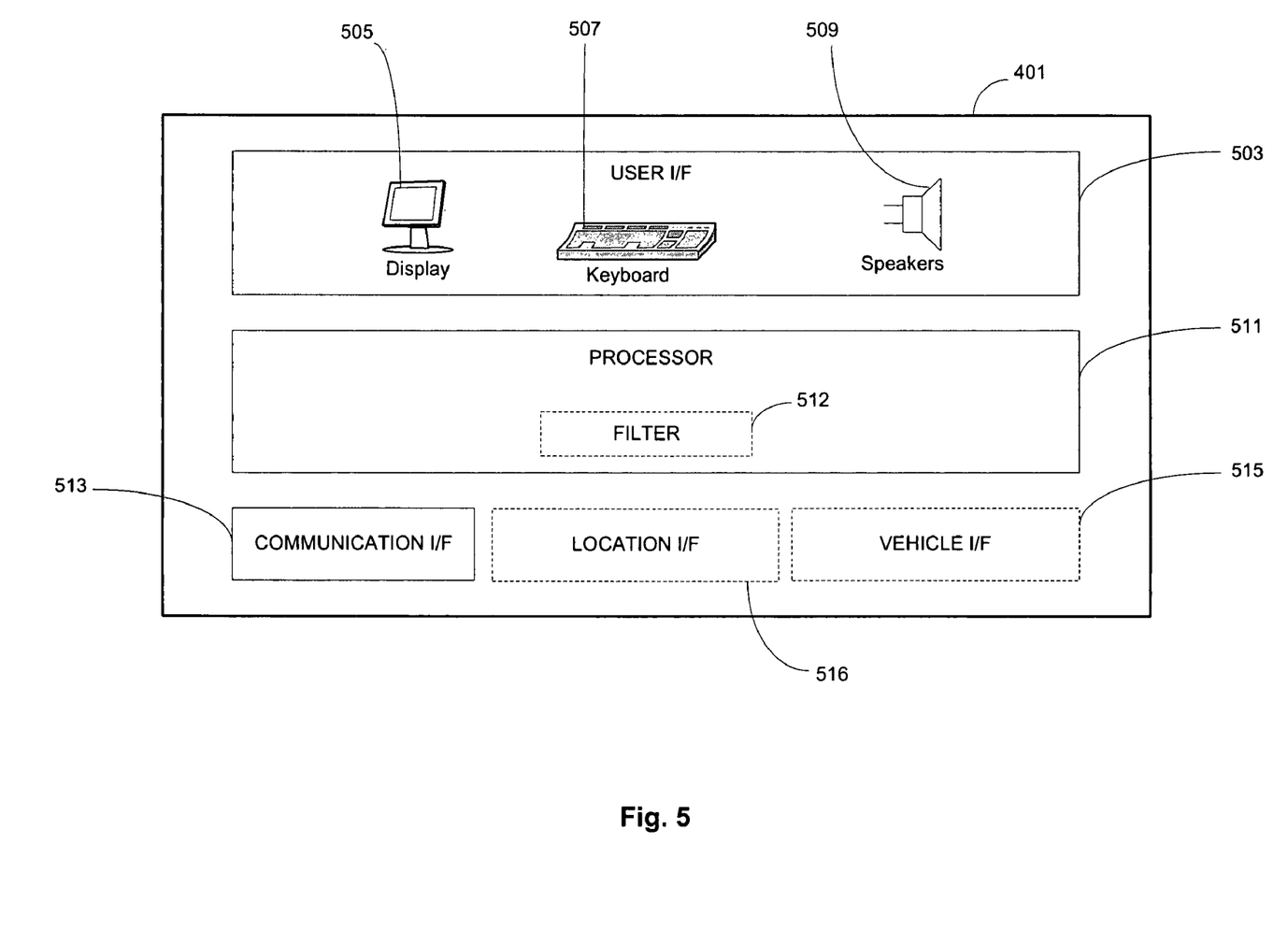
FIG. 5 is a diagram illustrating a more specific embodiment of a client system on the roadway travel data exchange network of FIG. 3, for example, in accordance with various aspects of the present invention.

Referring now to FIG. 5, there is illustrated a more specific embodiment of one of the client systems 401 in the roadway travel data exchange network of FIG. 3, for example, in accordance with various aspects of the present invention. In order to accomplish efficient exchange of travel data, the client system 401 comprises a user interface 503, a processor 511 and a communication interface 513.

The client system 401 is adapted to collect, transmit, receive and deliver travel data. Where the client system 401 is "dedicated" or embedded in a vehicle, a vehicle interface 515 supports the collection of travel data related to the vehicle in which it is embedded. Such travel data may comprise, for example, information on the vehicle speed, tire pressure, airbag deployment, etc.

In the present embodiment, geographic location information of a vehicle is determined through location circuitry. If the location circuitry is present in the vehicle in which the client system is located, then the location circuitry will deliver the geographic location information to the client system 401 via the vehicle interface 515. However, if the vehicle lacks location circuitry, the client system 401 may comprise location circuitry within a location interface 516. For example, in one embodiment, the location interface 516 comprises GPS (Global Positioning System) circuitry. In other embodiments, geographic location may be determined by any sufficiently reliable mechanisms for determining location, such as mechanisms employing triangulation techniques. The GPS circuitry may also assist in determining speed and direction of a vehicle if such travel data may not be collected directly via the vehicle interface 515.

The user interface 503 comprises a keyboard 507, which may be used to enter travel data manually or otherwise interact with the client system 401. For example, the keyboard might be used to request travel data from the storage and processing system 317 of FIG. 3. Of course, any other user input devices such as a touchscreen, mouse, buttons, dials or switches might also, or alternatively, be used.

Travel data which is delivered to the client system 401 is displayed on a display 505. The client system 401 may also provide for audible notification of the received travel data via speakers 509. Information which is entered or received via the client system 401 is processed by the processor 511. A communication interface 513 communicatively couples the client system 401 with the communication infrastructure so as to provide access to the storage and processing system 317, for example. Through the communication interface 513, processed, post-processed and collected travel data is exchanged. For example, the storage and processing system 317 delivers processed travel data to the client system 401 for display and audible output on the display 505 and speakers 509 respectively.

The processor 511 may perform filtering of the travel data by utilizing the filter 512. The filter 512 may be software, hardware, firmware, or any combination thereof. In addition, the filter 512 may be embedded in the client system 401, or it may be communicatively coupled to the client system 401.

Figure 6:
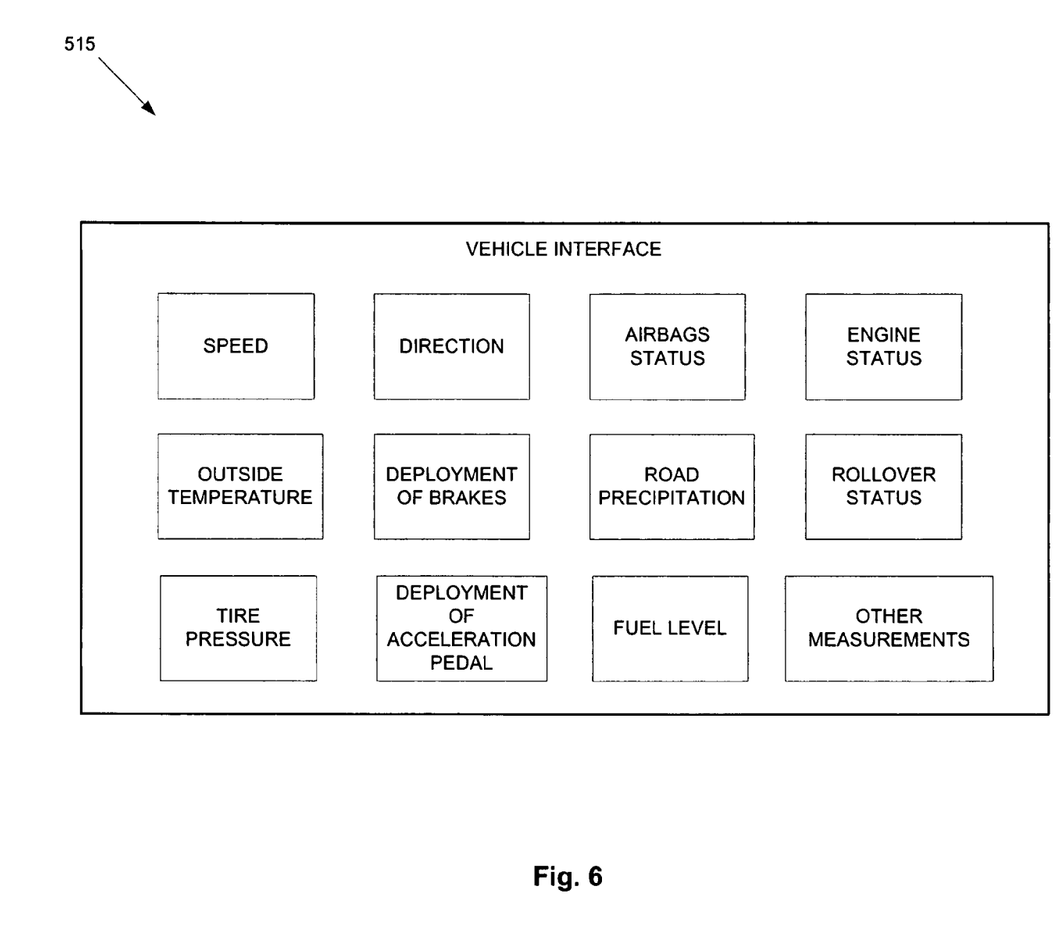
FIG. 6 is a diagram illustrating an embodiment of a vehicle interface on the plurality of client systems of FIG. 4, for example, in accordance with various aspects of the present invention.

Referring now to FIG. 6, there is illustrated a diagram of an embodiment of a vehicle interface on the plurality of client systems of FIG. 4, for example, in accordance with various aspects of the present invention. The vehicle interface 515 provides functionality for collecting travel data that is related to the vehicle in which it is embedded. Travel data that may be collected by a client system may include, for example, a geographic location, a speed, a direction, an airbag status, an engine status, an outside temperature, a deployment status of vehicle brakes, a road precipitation status, a rollover status, a tire pressure status, a deployment status of an acceleration pedal, and a fuel level.

Geographic location information of a vehicle may be determined, for example, through a GPS, such as the GPS 413 of FIG. 4. GPS may also assist in determining speed and direction of a vehicle if the client system is not embedded and such traffic data may not be collected directly via the vehicle interface 515. Speed and direction of a vehicle may be determined by measuring the vehicle's location with a GPS several times over a specific time interval. The traveled distance and time may then be calculated and may be used to determine speed and direction.

Figure 7:
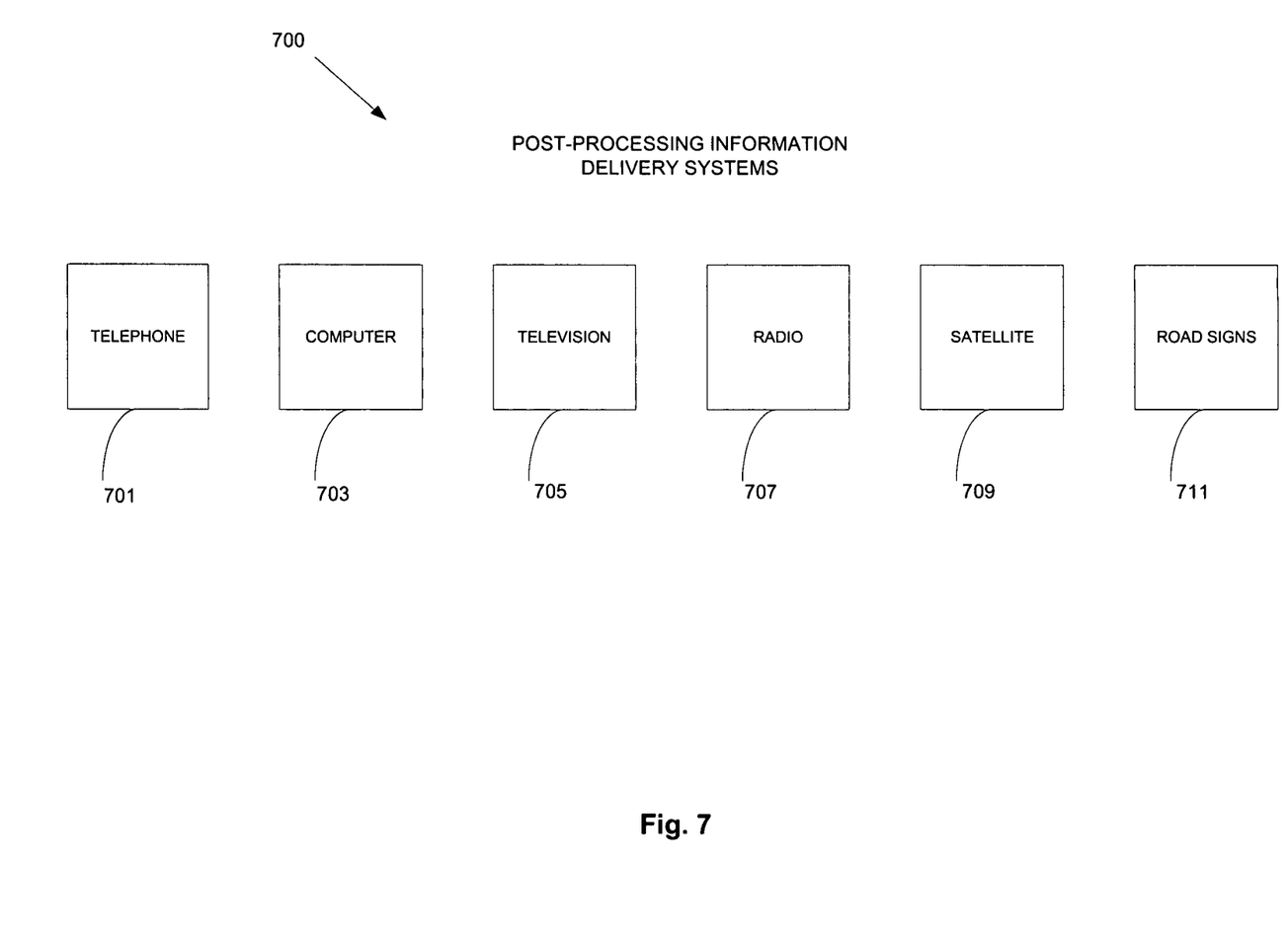
FIG. 7 is a diagram illustrating an embodiment of post-processing information delivery systems on the roadway travel data exchange network of FIG. 3, for example, in accordance with various aspects of the present invention.

Referring now to FIG. 7, there is illustrated an embodiment of post-processing information delivery systems on the roadway travel data exchange network of FIG. 3, for example, in accordance with various aspects of the present invention. Various post-processing information delivery systems 700 may be utilized in the retrieval/post-processing systems 313 of FIG. 3. Travel data communicated from the storage and processing system 317 may, for example, be delivered to a telephone 701, a computer 703, a television 705, a radio 707, a satellite 709, or a road sign display 711.

The telephone 701 may, for example, be a dedicated telephone line. Users of the roadway travel data exchange network may dial this dedicated phone line and hear a recorded message with specific travel data. The contents of the recorded message may be periodically updated with new travel data. Several post-processing information delivery systems may be utilized at the same time. For example, information about an accident may be displayed on a road sign display 711, while at the same time a radio 707 may broadcast information on alternate routes that may be utilized around the accident site.

Figure 8:
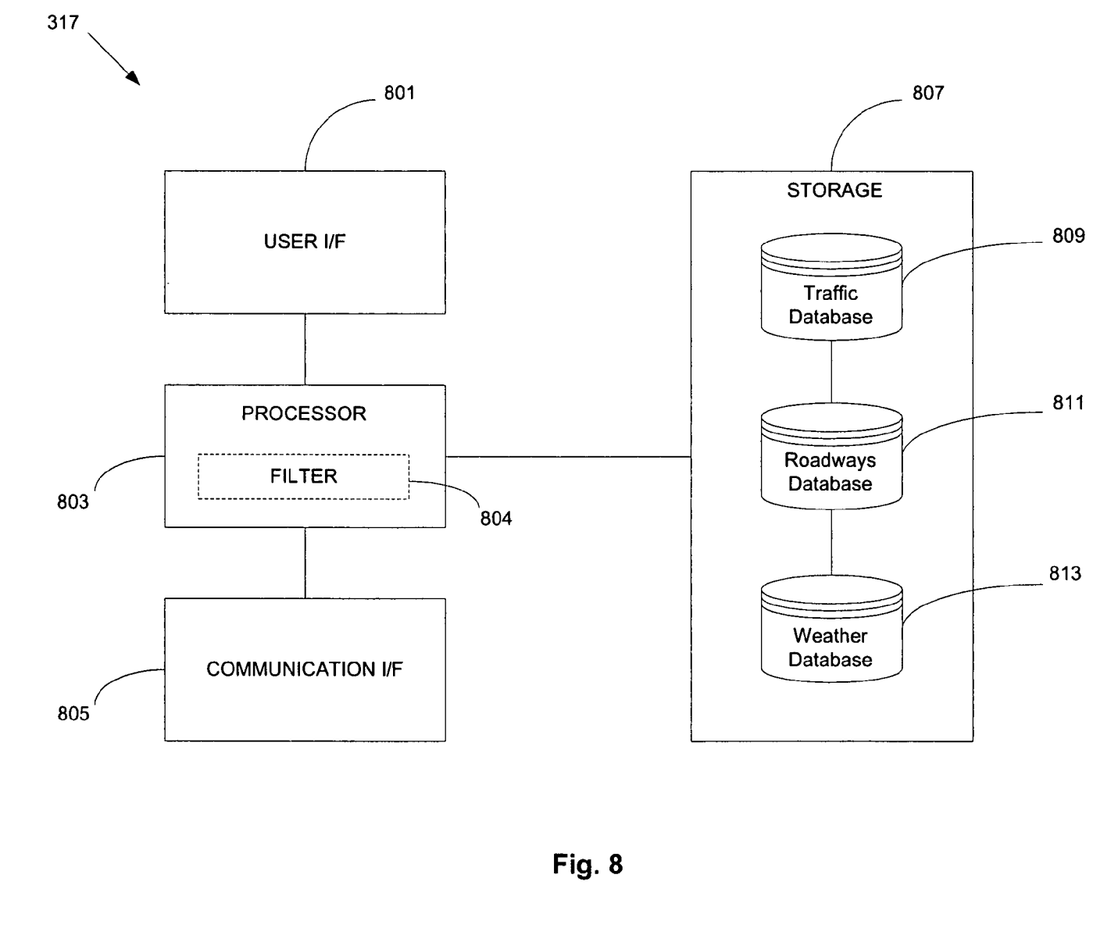
FIG. 8 is a diagram illustrating an embodiment of a storage and processing system on the roadway travel data exchange network of FIG. 3, for example, in accordance with various aspects of the present invention.

Referring now to FIG. 8, there is illustrated an embodiment of a storage and processing system on the roadway travel data exchange network of FIG. 3, for example, in accordance with various aspects of the present invention. The storage and processing system 317 comprises a communication interface 805 for communicating with the roadway travel data exchange network via the communication infrastructure 315 of FIG. 3. Travel data received by the storage and processing system 317 via the communication interface 805 is processed by a processor 803, and is subsequently stored in storage 807. The storage 807 comprises several databases, which are associated with the type of travel data they contain. For example, the storage 807 comprises a traffic database 809, a roadways database 811, and a weather database 813. The traffic database 809 stores all roadway travel data related to traffic. The roadways database 811 stores information about the specific geographic location of a roadway network and specific roadway characteristics, such as type of road, length, maximum allowed speed, number of lanes, etc. The weather database stores the weather-related data that is received, for example, from supporting collection systems 305 of FIG. 3. The storage and processing system 317 may also comprise a user interface 801, which may allow an authorized user to directly input into the storage and processing system traffic-related, roadway-related, or weather-related information, or to edit existing information.

In addition, the processor 803 may perform filtering of the travel data by utilizing the filter 804. The filter 804 may be software, hardware, firmware or any combination thereof. In addition, the filter 804 may be embedded in the storage and processing system 317, or it may be communicatively coupled to the storage and processing system 317.

In an embodiment of the present invention, the roadway travel data exchange network may comprise a plurality of storage and processing systems. For example, in order to increase efficiency in the exchange of information, a storage and processing system may be placed near several major roads or intersections so that travel data may be reported to the storage and processing system which is closest to the reporting vehicle. The plurality of storage and processing systems may be connected together, or to a main storage and processing system, via the communication network infrastructure 315.

In another embodiment of the present invention, information filtering on the roadway travel data exchange network 300 may be accomplished by a plurality of filters, functioning in accordance with various aspects of the present invention. A filter 512 in a client system 401 in FIG. 5, for example, may utilize user-defined criteria for filtering of travel data transmitted or received by the client system 401. The filter 512 on the client system 401 may, for example, be programmed to deliver only certain type of travel data (e.g., the location of gas stations within a 5 mile radius of the current location of the client system). The filter 512 may also be programmed to filter out all travel data if the client system is not on a known roadway, or if the client system is not in a moving vehicle. Another filter 804 in FIG. 8 may, at the same time, be located on the storage and processing system 317 and may additionally filter travel data according to other filtering criteria.

The terms "filter" and "filtering" as utilized herein do not refer to filtering of noise from a received signal, for example. The present invention may not be limited by any such definitions. In one aspect of the invention, filtering may comprise screening all, or selected portions of, travel information. Travel information screening may be initiated prior to transmission of travel information or after transmission of travel information. Accordingly, travel information screening may be initiated at the transmitting side and/or at the receiving side, respectively. In this manner, screening/filtering of travel information may alter amount and/or content of future travel information transmissions, or prevent future travel information transmissions altogether.

In one aspect of the invention, filtering of travel information may be programmable. For example, a travel data processing system in accordance with the present invention may be adapted to communicate and/or receive one or more travel information filtering instructions indicating one or more filtering preferences. The filtering preferences may comprise time of filtering, duration of filtering, type of travel information to be filtered, and/or travel participants affected, for example. Accordingly, aspects of the travel data processing systems may be altered and/or programmed automatically, or via a user intervention.

Figure 9:
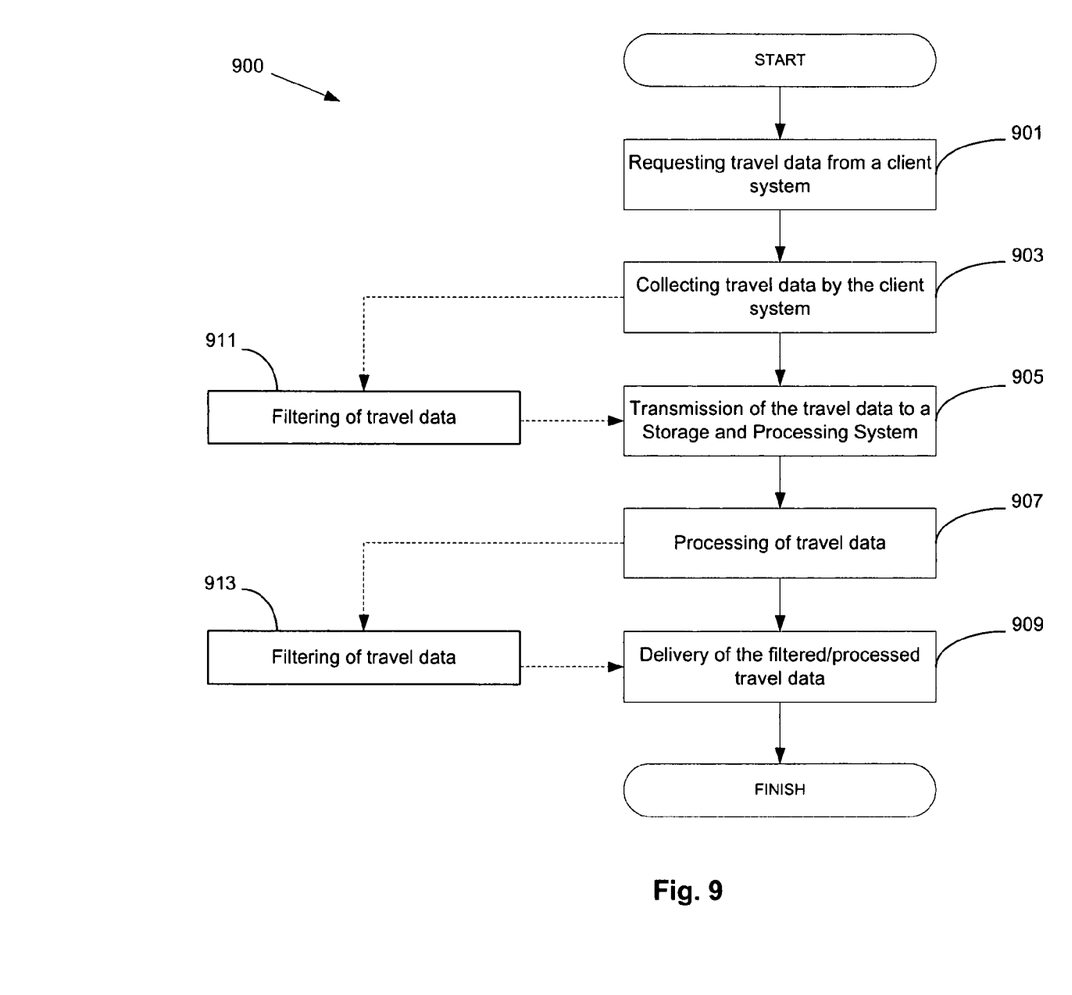
FIG. 9 is a flowchart illustrating a general embodiment of a method for collection, filtering and delivery of travel data on the roadway travel data exchange network of FIG. 3, for example, in accordance with various aspects of the present invention.

Referring now to FIG. 9, there is illustrated a general embodiment of a method 900 for collection, filtering and delivery of travel data on the roadway travel data exchange network of FIG. 3, for example, in accordance with various aspects of the present invention. At 901, travel data is requested by a storage and processing system from a client system on a roadway travel data exchange network. At 903, a multipurpose client system or a dedicated client system collects the requested travel data. The travel data is then filtered, at 911, by a filter, such as a filter embedded in the client system, prior to the client system transmitting it to the storage and processing system. The client system then transmits, at 905, the collected travel data to the storage and processing system via a communication network infrastructure. At 907, the travel data is processed by a processor at the storage and processing system. After the travel data is processed by the processor it may be stored in a storage provided at the storage and processing system. As an alternative to the filtering at 911 by the embedded filter the travel data may be filtered, at 913, by the storage and processing system (for example, a filter such as filter 804 of FIG. 8 may be used). At 909, the filtered travel data is delivered from the storage and processing system to the same client system or to another client system for post-processing.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A travel data processing system, comprising:
   a collection system configured to collect travel data associated with at least one mobile device that is communicatively coupled to a communication network; and
   a filter system configured to assign at least one weight to the collected travel data and generate filtered travel data that is relevant to the at least one mobile device by discarding at least a portion of the collected travel data, the generating of the filtered travel data based on the at least one weight assigned to the collected travel data.

2. The travel data processing system of claim 1, wherein the filter system comprises at least one filter device communicatively coupled to the communication network.

3. The travel data processing system of claim 1, wherein the at least one mobile device is a part of the filter system.

4. The travel data processing system of claim 1, wherein the filter system controls the flow of the filtered travel data based on analysis of the collected travel data.

5. The system of claim 1, wherein the filter system uses known roadway information.

6. The travel data processing system of claim 1, wherein the filter system uses pedestrian velocity estimates to generate the filtered travel data.

7. The travel data processing system of claim 1, wherein the filter system filters out undesired travel data to generate the filtered travel data.

8. The travel data processing system of claim 7, wherein the filter system filters out the undesired travel data based on the at least one weight value assigned to the collected travel data.

9. The travel data processing system of claim 1, wherein the filtering system filters the collected travel data based on at least one filtering criteria.

10. The travel data processing system of claim 1, wherein the filtering system extrapolates at least a part of the collected travel data to generate the filtered travel data.

11. The travel data processing system of claim 1, wherein the collection system collects the travel data at predetermined intervals.

* * * * *